United States Patent
Yanagihara et al.

(12) 
(10) Patent No.: US 6,506,807 B1
(45) Date of Patent: Jan. 14, 2003

(54) PROCESS FOR PREPARING PRE-EXPANDED PARTICLES OF THERMOPLASTIC RESIN

(75) Inventors: Yutaka Yanagihara, Settsu (JP); Kenji Mogami, Settsu (JP); Naruhiko Akamatsu, Hyogo-Pref (JP)

(73) Assignee: Kaneka Corporation, Osaka (JP)

( * ) Notice: Subject to any disclaimer, the term of this patent is extended or adjusted under 35 U.S.C. 154(b) by 80 days.

(21) Appl. No.: 09/592,674

(22) Filed: Jun. 13, 2000

(30) Foreign Application Priority Data

Jun. 14, 1999 (JP) ............................... 11-166610

(51) Int. Cl.[7] .................................................. C08J 9/16
(52) U.S. Cl. ............................. 521/56; 521/58; 521/60; 264/37.18; 264/37.23
(58) Field of Search .................................. 521/56, 58, 59, 521/60; 264/37.18, 37.23, 37.28

(56) References Cited

U.S. PATENT DOCUMENTS

| 4,016,110 A | 4/1977 | Cohrs et al. ............... 260/2.5 |
| 4,200,601 A | * 4/1980 | McClain ...................... 264/9 |
| 4,424,318 A | 1/1984 | Vairetti et al. ............... 526/88 |
| 5,234,963 A | 8/1993 | Garcia et al. ................ 521/76 |
| 5,580,503 A | * 12/1996 | Hall, III et al. .............. 264/53 |

FOREIGN PATENT DOCUMENTS

| WO | WO97/38048 | 10/1997 |

* cited by examiner

*Primary Examiner*—James J. Seidleck
*Assistant Examiner*—Melanie Bissett
(74) *Attorney, Agent, or Firm*—Armstrong, Westerman & Hattori LLP

(57) ABSTRACT

A process for preparing pre-expanded particles of a thermoplastic resin without washing the prepared pre-expanded particles to remove a dispersing agent remaining thereon and without discharging waste water, which comprises charging particles of a thermoplastic resin and an aqueous dispersion medium containing a dispersing agent into a closed pressure vessel, heating the resulting aqueous dispersion to a temperature of not less than the softening point of the thermoplastic resin, thereby impregnating the particles with water to have a water content of 1 to 50% by weight, releasing the dispersion into a lower pressure atmosphere, thereby expanding the particles, recovering the dispersion medium containing the dispersing agent, and recycling it as a dispersion medium to the pressure vessel.

7 Claims, 2 Drawing Sheets

PROCESS FOR PREPARING PRE-EXPANDED PARTICLES OF THERMOPLASTIC RESIN

BACKGROUND OF THE INVENTION

The present invention relates to a process for preparing pre-expanded particles of a thermoplastic resin, and more particularly to a process for preparing thermoplastic resin pre-expanded particles, which are suitable for example as a raw material for the production of in-mold foamed articles, without causing environmental pollution.

It is well known to prepare thermoplastic resin pre-expanded particles by a process wherein thermoplastic resin particles are dispersed into an aqueous dispersion medium in a pressure vessel and, after raising the temperature and pressure, are released into a lower pressure zone as disclosed, for example, in Japanese Patent Publication Kokai No. 59-176336.

As one of such processes, for example, Japanese Patent Publication Kokoku No. 7-5784 discloses a process wherein thermoplastic resin particles containing a volatile blowing agent are dispersed into water in a pressure vessel, and after the temperature and pressure in the vessel are elevated to a high temperature and a high pressure, the resulting aqueous dispersion is released into a lower pressure atmosphere which is lower than the pressure in the vessel and into which hot water of at least 40° C. is sprayed or steam is introduced, thereby expanding the particles (the process being hereinafter referred to as "pressure release expansion method"). Such a process provides thermoplastic resin pre-expanded particles suitable for the production of cellular molded articles having a small shrinkage by an in-mold foaming method.

In this process, a slightly water-soluble inorganic compound (hereinafter referred to as "inorganic dispersant") and a surface active agent (hereinafter referred to as "dispersing assistant") are used as a dispersant in order to prevent the particles from melt-adhering together under high temperature and high pressure. Even after the aqueous dispersion is released into a lower pressure atmosphere from the vessel under high temperature and high pressure conditions to produce pre-expanded particles, a part of the dispersant still sticks to and remains on the surface of the produced pre-expanded particles (the dispersant sticking and remaining on the surface of pre-expanded particles being also hereinafter referred to as "sticking dispersant").

In particular, in case of using a volatile blowing agent such as butane, agglomeration of dispersoid is easy to occur since it has a large effect of plasticizing the surface of the resin particles. In that case, a large amount of an inorganic dispersant and/or a dispersing assistant is required to prevent the agglomeration, and inevitably the amount of the sticking dispersant on the surface of pre-expanded particles tends to increase. If the amount of sticking dispersant is large, the sticking dispersant hinders the pre-expanded particles from well fusing together when the pre-expanded particles are filled in a mold and heated with steam or the like to give in-mold foamed articles.

In order to solve such a problem, after expanding the resin particles, the obtained pre-expanded particles are generally washed with (a) a large amount of water or hot water or (b) an aqueous solution of an acid. These washing liquids containing the dispersant are combined with an aqueous dispersion medium separated from the pre-expanded particles in the expansion step of resin particles and are discharged together as a waste water without recovering them.

However, the washing means (a) requires the use of a large amount of wash water, since the washing effect is small and the efficiency of removing the sticking dispersant is low, thus economically disadvantageous. The washing with hot water also has the problem of increase in utility cost, since a large amount of energy is required in heating water.

On the other hand, the washing means (b) has the problems that equipment cost increases since the equipment must be made resistant to acid, and no effect is obtained if the dispersant used is insoluble in acid.

The washing waste water and the aqueous dispersion medium separated from the expansion step are discharged after being subjected to an appropriate treatment. In case of the washing means (a), a large amount of waste water must be treated before discharge, thus resulting in increase of cost. In case of the washing means (b), since the inorganic dispersant has been solubilized, an additional step such as reprecipitation step or adsorption removal step is required, so not only the process becomes complicated but also the cost increases.

From the viewpoint of environmental protection, it is demanded to decrease the amount of waste water.

It is an object of the present invention to provide a process for preparing pre-expanded particles of thermoplastic resins without causing environmental pollution.

A further object of the present invention is to provide a process for preparing pre-expanded particles of thermoplastic resins according to which a dispersant sticking onto the pre-expanded particles can be efficiently rinsed and removed and the amount of waste water to be treated before the disposal can be remarkably decreased.

A still further object of the present invention is to provide a process for preparing pre-expanded particles of thermoplastic resins which does not require the use of an acid-resistant equipment in the washing step.

These and other objects of the present invention will become apparent from the description hereinafter.

SUMMARY OF THE INVENTION

It has now been found that so long as an aqueous dispersion of resin particles to be released from a pressure vessel into a lower pressure atmosphere is stable, the amount of a dispersant to be charged into the aqueous dispersion can be decreased to less than that used in a conventional process using a volatile blowing agent, and the aqueous dispersion is stable even if the amount of a dispersant is decreased when water included in the resin particles is utilized as a blowing agent without impregnating the resin particles with a volatile blowing agent such as butane, or when the expansion of resin particles is carried out by means of releasing the aqueous dispersion kept under a high pressure into a lower pressure atmosphere without using a volatile blowing agent, so the amount of a dispersant sticking to the surface of produced pre-expanded particles can be decreased even if the pre-expanded particles are not washed. It has been also found that the thus prepared pre-expanded particles can be well fused together in a mold to give in-mold foamed articles without being hindered by the remaining dispersant and, as a result, it is not necessary to wash the produced pre-expanded particles with water or an acid and, further, the aqueous dispersion medium can be repeatedly used since a stable aqueous dispersion can be formed even if the dispersion medium containing an inorganic dispersant and a dispersing assistant is recovered and recycled to the pressure vessel without any treatment.

In accordance with the present invention, there is provided a process for preparing pre-expanded particles of a thermoplastic resin which comprises charging particles of a thermoplastic resin and an aqueous dispersion medium containing, as a dispersant, a slightly water-soluble inorganic compound and a surface active agent into a closed pressure vessel, heating the resulting aqueous dispersion to a temperature of not less than the softening point of said thermoplastic resin, releasing said aqueous dispersion from said vessel into an atmosphere of lower pressure than the inner pressure of said vessel, thereby expanding said particles, recovering said aqueous dispersion medium containing the slightly water-soluble inorganic compound and the surface active agent, and recycling it as a dispersion medium to said closed pressure vessel.

The thermoplastic resin particles are preferably polyolefin resin particles, more preferably particles made of a polyolefin resin composition containing a polyolefin resin and 0.01 to 20 parts by weight of a hydrophilic polymer per 100 parts by weight of the polyolefin resin. An ethylene-based ionomer resin is preferred as the hydrophilic polymer.

Preferably, the slightly water-soluble inorganic compound is used in an amount of 0.15 to 2.0 parts by weight per 100 parts by weight of the thermoplastic resin particles.

In the process of the present invention, prior to releasing the aqueous dispersion into a lower pressure atmosphere the inner pressure of the vessel may be raised by introducing an inorganic gas such as nitrogen gas or air to the vessel and subsequently the aqueous dispersion is released while maintaining that pressure, whereby the expansion ratio of the obtained pre-expanded particles can be increased.

DETAILED DESCRIPTION

Figure 1:
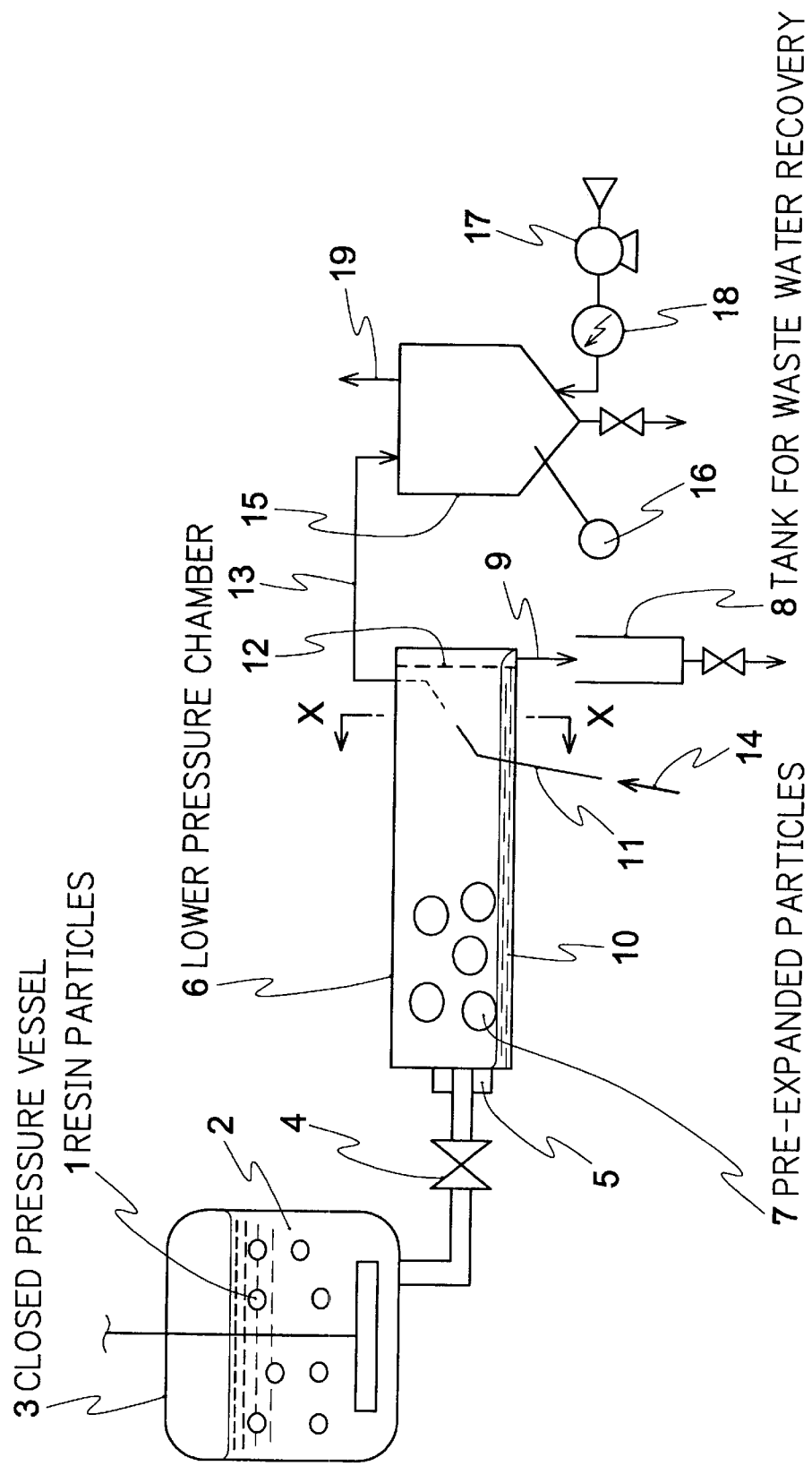
FIG. 1 is a schematic view showing an apparatus for preparing pre-expanded particles used in an example described after of the present invention.

In the present invention, expansion of resin particles to produce pre-expanded particles is carried out by a known process, that is to say, by a pressure release expansion process wherein particles of a thermoplastic resin and an aqueous dispersion medium containing, as a dispersant, a slightly water-soluble compound (inorganic dispersant) and a surface active agent (dispersing assistant) are charged into a closed pressure vessel and heated to a temperature of not less than the softening point of the thermoplastic resin, and after reaching a prescribed temperature and a prescribed pressure, the aqueous dispersion is discharged from the pressure vessel into an atmosphere of lower pressure than the inner pressure of the vessel, thereby expanding the particles. In the present invention, water included in the resin particles is utilized as a blowing agent.

As the thermoplastic resin constituting the thermoplastic resin particles can be used any of thermoplastic resins so long as they show a viscoelasticity suitable for expansion when heated. Examples of the thermoplastic resin are, for instance, a styrene polymer such as polystyrene, high impact polystyrene, poly-α-methylstyrene, styrene-maleic anhydride copolymer, graft copolymer of polyphenylene oxide and styrene, styrene-acrylonitrile copolymer, acrylonitrile-butadiene-styrene ternary copolymer or styrene-butadiene copolymer; a polyolefin resin such as low density polyethylene, medium density polyethylene, high density polyethylene, polypropylene, ethylene-propylene copolymer, ethylene-vinyl acetate copolymer or ethylene-methyl methacrylate copolymer; an aromatic polyester such as polyethylene terephthalate or polybutylene terephthalate; and the like. The thermoplastic resins may be used alone or in combination thereof.

Of these thermoplastic resins, polyolefin resins are preferably used from the viewpoint of providing pre-expanded particles which have excellent expandability and moldability and which provide cellular molded articles having a high expansion ratio and well balanced mechanical strength, heat resistance and flexibility.

The polyolefin resins preferred in the present invention are polymers containing 50 to 100% by weight, especially 70 to 100% by weight, of units of an olefin monomer and 0 to 50% by weight, especially 0 to 30% by weight, of units of a monomer copolymerizable with the olefin monomer. Since the polyolefin resins contains at least 50% by weight of olefin monomer units, they give cellular molded articles having a light weight and superior in mechanical strength, processability, electrical insulation, water resistance and chemical resistance. The units of the monomer copolymerizable with the olefin monomer are a component used for improving properties such as adhesion, transparency, impact resistance and gas barrier property, and it is preferable in obtaining the effects produced by the use thereof that the content thereof is at least 2% by weight, especially at least 5% by weight.

Examples of the olefin monomer are an α-olefin monomer having 2 to 8 carbon atoms such as ethylene, propylene, butene, pentene, hexene, heptene or octene, a cyclic olefin such as norbornene monomers, and the like. Ethylene and propylene are preferred among them, since they are inexpensive and physical properties of the obtained polymers are good. The olefin monomers may be used alone or in admixture thereof.

Examples of the monomer copolymerizable with the olefin monomer are, for instance, a vinyl alcohol ester such as vinyl acetate, an alkyl (meth)acrylate having a $C_1$ to $C_6$ alkyl group such as methyl methacrylate, ethyl acrylate or hexyl acrylate, vinyl alcohol, methacrylic acid, vinyl chloride, and the like. Of these, vinyl acetate is preferred from the viewpoints of adhesion, flexibility and low temperature characteristics, and methyl methacrylate is preferred from the viewpoints of adhesion, flexibility, low temperature characteristics and heat stability. These may be used alone or in admixture thereof.

Examples of the polyolefin resin as mentioned above are, for instance, a polypropylene resin such as ethylene-propylene random copolymer, ethylene-propylene-butene random terpolymer, polyethylene-polypropylene block copolymer or propylene homopolymer; a polyethylene resin such as low density polyethylene, medium density polyethylene, high density polyethylene, linear low density polyethylene, ethylene-vinyl acetate copolymer or ethylene-methyl methacrylate copolymer; polybutene; polypentene; and the like.

The polyolefin resins may be non-crosslinked ones, or may be crosslinked by means of a peroxide or radiation. Among the polyolefin resins, polypropylene resins are preferred, since pre-expanded particles having a high expansion ratio are easy to be obtained as compared with other polyolefin resins, and since molded articles prepared from the obtained pre-expanded particles are good in mechanical strength and heat resistance. The polyolefin resins may be used alone or in admixture thereof.

Taking polypropylene resins as an example of the polyolefin resins, preferred are those having a melt index (MI) of 0.5 to 30 g/10 minutes, especially 3 to 10 g/10 minutes, a modulus of flexural elasticity (JIS K 7203) of 5,000 to 20,000 kg/cm$^2$, especially 8,000 to 16,000 kg/cm$^2$, and a melting point of 125 to 165 C., especially 135 to 150 C. If the MI of polypropylene resins is less than 0.5 g/10 minutes, pre-expanded particles having a high expansion ratio are hard to be obtained since the melt viscosity is too high. If the MI is more than 30 g/10 minutes, cells are easy to be broken since the melt viscosity to elongation of the resin at the time of foaming is low, thus there is a tendency that pre-expanded particles having a high expansion ratio are hard to be obtained. If the modulus of flexural elasticity is less than 5,000 kg/cm$^2$, the mechanical strength and heat resistance are insufficient, and if the modulus of flexural elasticity is more than 20,000 kg/cm$^2$, the flexibility and cushioning property of the obtained cellular molded articles tend to be insufficient. If the melting point is less than 125° C., the heat resistance is insufficient, and if the melting point is more than 165° C., the melt adhesion and secondary expandability of the pre-expanded particles tend to be insufficient. These values are shown by way of example and of course are not limited thereto.

The thermoplastic resins may be incorporated with a hydrophilic polymer so that water can be included in the resin particles and sufficiently serves as a blowing agent upon the preparation of pre-expanded particles. In case that the thermoplastic resin which constitutes the resin particles is a hydrophobic thermoplastic resin such as polyolefin resins, it is preferable to incorporate the thermoplastic resin with a hydrophilic polymer other than the thermoplastic resin used as the base resin of the particles.

The hydrophilic polymer means polymers, the water absorption of which measured according to ASTM D570 is at least 0.5% by weight. It encompasses so-called hygroscopic polymers, water-absorptive polymers and water-soluble polymers. Such hydrophilic polymers may contain hydrophilic groups, such as carboxyl group, hydroxyl group, amino group, amido group, ester group and polyoxyethylene group, in their molecules.

Representative examples of the hygroscopic polymers are, for instance, carboxyl group-containing polymers, polyamides, thermoplastic polyester elastomers, cellulose derivatives, and the like.

Examples of the carboxyl group-containing polymers are, for instance, ethylene-acrylic acid-maleic anhydride terpolymer (water absorption 0.5 to 0.7% by weight), ionomers wherein carboxyl groups of ethylene-(meth)acrylic acid copolymer are neutralized with an alkali metal ion such as sodium ion or potassium ion to intermolecularly crosslink the copolymer (water absorption 0.7 to 1.4% by weight), ethylene-(meth)acrylic acid copolymer (water absorption 0.5 to 0.7% by weight), and the like. These may be used alone or in admixture thereof. Among the carboxyl group-containing polymers, ethylene-based ionomers wherein an ethylene-(meth)acrylic acid copolymer is intermolecularly crosslinked with an alkali metal ion such as sodium ion or potassium ion, are particularly preferred since they have an excellent dispersibility into polyolefin resins.

Examples of the polyamides are, for instance, nylon 6 (water absorption 1.3 to 1.9% by weight), nylon 66 (water absorption 1.1 to 1.5% by weight), copolymer nylons (e.g., product of EMS-CHEMIE AG, trade mark Griltex) (water absorption 1.5 to 3% by weight), and the like.

Examples of the thermoplastic polyester elastomers are, for instance, block copolymers of polybutylene terephthalate and polytetramethylene glycol (water absorption 0.5 to 0.7% by weight), and the like.

Examples of the cellulose derivatives are, for instance, cellulose acetate, cellulose propionate, and the like.

These hygroscopic polymers may be used alone or in admixture thereof. Among the hygroscopic polymers, ionomer resins are preferred, since they have an excellent dispersibility into polyolefin resins and since a water-containing polyolefin resin composition having a high water content is obtained by the use of a relatively small amount of ionomer resins. Known ionomer resins can be used, and ionomers undergoing ionic crosslinking with an alkali metal ion are particularly preferred.

The term "water-absorptive polymer" as used herein means polymers which absorb water in an amount of several to several hundreds times the weight of its own without being dissolved in water and are hard to be dehydrated even if a pressure is applied. Representative examples of the water-absorptive polymers are, for instance, crosslinked polyacrylic acid salt polymers, starch-acrylic acid graft copolymers, crosslinked polyvinyl alcohol polymers, crosslinked polyethylene oxide polymers, isobutylene-maleic acid copolymer, and the like. These water-absorptive polymers may be used alone or in admixture thereof.

Examples of the crosslinked polyacrylic acid salt polymer are, for instance, crosslinked sodium polyacrylates as represented by Aqualic (trade mark) made by Nippon Shokubai Co., Ltd. and Diawet (trade mark) made by Mitsubishi Chemical Corporation, and the like. Examples of the crosslinked polyvinyl alcohol polymer are, for instance, those as represented by Aquareserve GP (trade mark) made by Nippon Gohsei Kagaku Kogyo Kabushiki Kaisha. Examples of the crosslinked polyethylene oxide polymer are, for instance, those as represented by Aquacork (trade mark) made by Sumitomo Seika Chemicals, Limited. Examples of the isobutylene-maleic acid copolymer are, for instance, those as represented by KI Gel (trade mark) made by Kuraray Co., Ltd.

Among the water-absorptive polymers, crosslinked polyethylene oxides are preferable, since the dispersibility into polyolefin resins is good and a high water content is obtained by the use in a relatively small amount.

The term "water-soluble polymer" as used herein means polymers soluble in water at ordinary temperature or an elevated temperature. Representative examples of the water-soluble polymers are, for instance, poly(meth)acrylic acid polymers, poly(meth)acrylic acid salt polymers, polyvinyl alcohol polymers, polyethylene oxide polymers, water-soluble cellulose derivatives, and the like.

Examples of the poly(meth)acrylic acid polymers are, for instance, polyacrylic acid, acrylic acid-ethyl acrylate copolymer, poly-2-hydroxyethyl methacrylate, and the like. Examples of the poly(meth)acrylic acid salt polymers are, for instance, sodium polyacrylate, sodium polymethacrylate, potassium polyacrylate, potassium polymethacrylate, and the like. Examples of the polyvinyl alcohol polymers are, for instance, polyvinyl alcohol, vinyl alcohol-vinyl acetate copolymer, and the like. Examples of the polyethylene oxide polymers are, for instance, polyethylene oxide having tens of thousands to millions of a molecular weight, and the like. Examples of the water-soluble cellulose derivatives are, for instance, carboxymethyl cellulose, hydroxyethyl cellulose, and the like. These water-soluble polymers may be used alone or in admixture thereof.

The hygroscopic polymers, the water-absorptive polymers and the water-soluble polymers may be used alone or in admixture thereof. These polymers are not limited to those exemplified above.

The amount of the hydrophilic polymer varies depending on the kind of hydrophilic polymer. In general, the hydrophilic polymer is incorporated into a thermoplastic resin such as a polyolefin resin in an amount of at least 0.01 part by weight, preferably at least 0.5 part by weight, per 100 parts by weight of the thermoplastic resin so that the water content of resin particles made of such a resin composition may reach 1 to 50% by weight when the resin particles are dispersed into an aqueous dispersion medium in a pressure vessel and heated at a temperature of not less than the softening point of the thermoplastic resin. Also, from the viewpoints of rendering the production stability and foaming characteristics in the preparation of pre-expanded particles good, imparting excellent mechanical strength and heat resistance to molded articles obtained from the pre-expanded particles and decreasing the dimensional change of molded articles upon absorption of water, it is preferable that the amount of the hydrophilic polymer is at most 20 parts by weight, especially at most 10 parts by weight, per 100 parts by weight of the thermoplastic resin.

Preferably, a filler is incorporated into a thermoplastic resin composition containing a thermoplastic resin (e.g., a polyolefin resin) and optionally a hydrophilic polymer, whereby pre-expanded particles having uniform cells and having a high expansion ratio can be obtained.

Any of inorganic fillers and organic fillers can be used as the filler.

Examples of the inorganic filler are, for instance, talc, calcium carbonate, calcium hydroxide, and the like. Talc is preferred among the inorganic fillers, since pre-expanded particles having uniform cells and having a high expansion ratio can be obtained.

The organic fillers are not particularly limited so long as they are in the solid state at a temperature of not less than the softening point of a thermoplastic resin. Examples of the organic filler are, for instance, a fluorocarbon resin powder, a silicone resin powder, a thermoplastic polyester resin powder, and other known organic fillers.

The fillers may be used alone or in admixture thereof.

The average particle size of the filler is at most 50 $\mu$m, preferably at most 10 $\mu$m, from the viewpoints that pre-expanded particles having uniform cells and having a high expansion ratio can be obtained and molded articles excellent in mechanical strength, flexibility and the like can be obtained from the pre-expanded particles, and is at least 0.1 $\mu$m, especially at least 0.5 $\mu$m, from the viewpoints of secondary agglomeration and handling workability.

From the viewpoint of obtaining pre-expanded particles having a high expansion ratio, it is preferable that the amount of the filler is not less than 0.01 part by weight, especially not less than 0.1 part by weight, per 100 parts by weight of a thermoplastic resin. Also, from the viewpoint of obtaining molded articles having excellent mechanical strength and flexibility from the pre-expanded particles with excellent melt adhesion exhibited upon molding the pre-expanded particles in a mold, the filler is used in an amount of not more than 3 parts by weight, preferably not more than 2 parts by weight, per 100 parts by weight of the thermoplastic resin.

The thermoplastic resin composition containing a thermoplastic resin, such as a polyolefin resin, and optionally a hydrophilic polymer and a filler is usually melt-kneaded by an extruder, a kneader, Banbury mixer, a roll mill or the like, and then formed into resin particles having a desired shape which is easy to adopt to pre-expansion, such as cylindrical, ellipsoidal, spherical, cubic or rectangular parallelepipedic shape. The conditions for the preparation of the resin particles and the size of the resin particles are not limited to specified ones. For example, particles obtained by melt-kneading a polyolefin resin composition in an extruder have a weight of 0.5 to 5 mg/particle.

Resin particles made of a polyolefin resin composition containing a polyolefin resin, a hydrophilic polymer and optionally a filler are particularly suitable for use in the process of the present invention.

Pre-expanded particles are prepared by dispersing the resin particles made of a resin composition containing a thermoplastic resin and optionally a hydrophilic polymer and/or a filler into an aqueous dispersion medium in a closed pressure vessel, heating the resin particles to a temperature of not less than the softening point of the thermoplastic resin to give water-containing resin particles having a water content of 1 to 50% by weight, and releasing the water-containing resin particles together with the aqueous dispersion medium into an atmosphere of lower pressure than the inner pressure of the vessel while keeping the inner pressure, thereby expanding the water-containing resin particles. Preferably, prior to releasing the resin particles from the pressure vessel, the inner pressure of the vessel is raised to a predetermined pressure within the range of 6 to 75 kg/cm$^2$G by introducing an inorganic gas to the vessel, and the resin particles are then released together with the aqueous dispersion medium to a lower pressure atmosphere while keeping that pressure, whereby the expansion ratio of the obtained pre-expanded particles can be increased.

The aqueous dispersion medium is typically water, and may be a mixture of water with a solvent such as ethylene glycol, glycerol, methyl alcohol or ethyl alcohol if the mixture does not dissolve the resin particles. Water is preferred from environmental and economical points of view.

Resin particles are dispersed into an aqueous dispersion medium in a pressure vessel to form an aqueous dispersion of the resin particles. The aqueous dispersion medium may contain a dispersing agent. Examples of the dispersing agent are, for instance, a slightly or sparingly water-soluble inorganic compound which is hard to dissolve in water, namely an inorganic dispersant such as calcium tertiary phosphate, basic magnesium carbonate, basic zinc carbonate or calcium carbonate, and a surface active agent such as sodium dodecylbenzene-sulfonate, sodium n-paraffinsulfonate or sodium α-olefin-sulfonate. In order to decrease the amount of the dispersing agent which sticks to the surface of the produced pre-expanded particles and to prevent the resin particles from agglomerating, the amount of the inorganic dispersant is selected from 0.15 to 2.0 parts by weight, preferably 0.3 to 1.0 part by weight, more preferably 0.4 to 0.8 part by weight, per 100 parts by weight of the resin particles. If the amount of the inorganic dispersant is less than 0.15 part by weight, the resin particles tend to melt-adhere to each other in the vessel during heating the aqueous dispersion. If the amount is more than 2.0 parts by weight, the amount of sticking dispersant increases unless the obtained pre-expanded particles are washed, so it would be difficult to produce in-mold foamed articles having a good melt-adhesion property from the pre-expanded particles. In case that the inorganic dispersant is calcium tertiary phosphate, the concentration of sticking dispersant on the surface of the pre-expanded particles is required to be at most 3,000 p.p.m. in order to obtain in-mold foamed articles having a good melt-adhesion property. If the concentration of sticking dispersant is more than 3,000 p.p.m., melt-adhesion failure may occur between the expanded particles or it would become difficult to obtain good foamed articles owing to rise of vapor pressure at the time of molding.

The surface active agent is used as a dispersing assistant. The amount of the dispersing assistant varies depending on the kind of the inorganic dispersant used and the kind and amount of the thermoplastic resin particles used, but is usually from 0.001 to 0.1 part by weight, preferably 0.01 to 0.08 parts by weight, per 100 parts by weight of the resin particles.

The amount of the resin particles to be dispersed into the aqueous dispersion medium is from 3 to 100 parts by weight, preferably from 10 to 50 parts by weight, per 100 parts by weight of the aqueous dispersion medium. If the amount of the resin particles is less than 3 parts by weight, the productivity is lowered, thus being uneconomical. If the amount is more than 100 parts by weight, the resin particles tend to be fused together in the vessel during heating.

The aqueous dispersion of the resin particles is heated to a temperature of not lower than the softening point of the thermoplastic resin used, preferably a temperature of not lower than "melting point of the thermoplastic resin +5° C.", and preferably to a temperature of not higher than "the melting point +20° C.", more preferably a temperature of not higher than "the melting point +15° C.". For example, in case of an ethylene-propylene copolymer having a melting point of 145° C., preferably the heating is conducted at a temperature of 145 to 165° C., especially 150 to 160° C. If the temperature is less than 145° C., expansion becomes difficult, and if the temperature exceeds 165° C., the mechanical strength and heat resistance of obtained foams are insufficient and also the resin particles are easy to fuse together in the vessel. The water content of the resin particles within the range of 1 to 50% by weight can be achieved by dispersing the resin particles made of a thermoplastic resin composition as mentioned above into an aqueous dispersion medium, heating the resulting aqueous dispersion to a temperature of not less than the softening point of the thermoplastic resin, and stirring the aqueous dispersion at that temperature for 10 minutes to 12 hours.

The term "softening point" as used herein means the heat distortion temperature of a thermoplastic resin and can be measured according to ASTM D648. Also, the melting point denotes the temperature corresponding to the top of a fusion peak appearing in a fusion curve measured by a differential scanning calorimetry (DSC) in such a manner as elevating the temperature from 40° C. to 220° C. at a rate of 10° C./minute, cooling to 40° C. at a rate of 10° C./minute and then elevating the temperature again to 220° C. at a rate of 10° C./minute.

The control of the water content in the resin particles can be conducted by controlling the heating temperature, the heating time and the like. If the water content is less than 1% by weight, the expansion ratio of the obtained pre-expanded particles is apt to become 3 or less. Preferably the water content is at least 3% by weight. If the water content is more than 50% by weight, the dispersibility of the resin particles into an aqueous dispersion medium is lowered and the resin particles agglomerates in the pressure vessel during heating the aqueous dispersion, so uniform expansion of the resin particles is apt to become difficult. Preferably the water content is at most 30% by weight.

The water absorption of a hydrophilic polymer denotes a value measured at ordinary temperature, whereas the water content of the resin particles as shown herein denotes a value measured at an elevated temperature, namely at a temperature of not less than the softening point of a thermoplastic resin to which the resin particles is heated. Therefore, for example, if the water absorption of a hydrophilic polymer used in the resin particles is not less than 0.5% by weight, a water content of not less than 1% by weight can be attained, since the water impregnation treatment is conducted at a high temperature.

By adjusting the water content of the resin particles within the range of 1 to 50% by weight, uniform pre-expanded particles having a high expansion ratio, e.g., an expansion ratio of 3 to 33, especially 4 to 20, can be produced without using a volatile blowing agent such as butane and without agglomerating the resin particles in a pressure vessel during the preparation thereof.

The term "water content" of resin particles as used herein means a water content under a water vapor pressure at a temperature of not less than the softening point of a thermoplastic resin to which the aqueous dispersion of the resin particles is heated. The water content value is obtained, for example, by charging a 300 ml pressure ampoule with 50 g of particles made of a thermoplastic resin composition, 150 g of water and, as a dispersing agent, 0.5 g of powdery basic calcium tertiary phosphate and 0.03 g of sodium n-paraffinsulfonate, closing the ampoule, heating the ampoule in an oil bath kept at a predetermined temperature of not less than the softening point of the thermoplastic resin for 3 hours, cooling to room temperature, taking out the resin particles from the ampoule, sufficiently washing the particles with water to remove the dispersing agent on the surface of the particles, removing water attached to the surface of the particles, measuring the weight of the obtained water-containing resin particles (weight of water-containing particles X), and then drying the particles for 3 hours in an oven set at a temperature 20° C. higher than the melting point of the resin particles and cooling to room temperature in a desiccator, measuring the weight of the dried particles (weight of dry particles Y) and then calculating the water content according to the equation (1).

$$\text{Water content (\% by weight)} = \{(X-Y)/Y\} \times 100 \qquad (1)$$

In case that the resin particles contain a hydrophilic polymer and a filler, the water content is a value based on the total weight of the thermoplastic resin, the hydrophilic polymer and the filler.

After the resin particles are dispersed into an aqueous dispersion medium and heated to impregnate the resin particles with the aqueous dispersion medium, typically water, in a closed pressure vessel, the aqueous dispersion is released from the vessel to an atmosphere of lower pressure than the pressure in the vessel, usually atmospheric pressure, whereby the resin particles are expanded to give pre-expanded particles. In order to smoothly conduct the release of the dispersion, the release may be conducted under pressure by introducing a nitrogen gas or the like into the closed vessel.

After impregnating the resin particles with an aqueous dispersion medium and before releasing the aqueous dispersion of resin particles, preferably an inorganic gas is introduced into the pressure vessel to raise the inner pressure of the vessel, and the aqueous dispersion is then released from the vessel, whereby the expansion ratio of the obtained pre-expanded particles can be increased.

Examples of the inorganic gas are, for instance, a nitrogen gas, air or an inorganic gas containing a nitrogen gas and/or air as a main component (usually in an amount of not less than 50% by volume, especially not less than 70% by weight) and a minor amount (not more than 50% by volume, especially not more than 30% by volume) of an inert gas such as argon, helium or xenon, steam, oxygen, hydrogen or ozone. Preferable inorganic gases are a nitrogen gas, air and a mixture thereof from the viewpoints of cost, productivity, safety, environmental suitability and the like.

The pressure in the closed pressure vessel after introducing the inorganic gas thereto is preferably from 6 to 75 kg/cm$^2$G, more preferably 10 to 70 kg/cm$^2$G. If the inner pressure is less than 6 kg/cm$^2$G, no satisfactory effects are obtained by the introduction of the inorganic gas, that is to say, the expansion ratio of the pre-expanded particles tends to be not sufficiently increased as compared with the case of no introduction of an inorganic gas. If the inner pressure exceeds 75 kg/cm$^2$G, the cell diameter of the pre-expanded particles becomes to small to result in lowering of the closed cell percentage and, therefore, the non-shrinkability, shape stability, mechanical strength and heat resistance of cellular molded articles prepared therefrom tend to be impaired.

The time from reaching a predetermined pressure by pressurizing with an inorganic gas up to release of the water-containing resin particles together with the aqueous dispersion medium into a lower pressure atmosphere is not particularly limited, but that time is preferably as short as possible from the viewpoint of improvement in productivity. In addition, the pressure in the vessel during the release is preferably held at the above-mentioned pressure reached.

The pressure vessel is not particularly limited and any vessels can be used so long as they can stand pressure and temperature in the pre-expansion step. A typical example is an autoclave type pressure vessel.

The "lower pressure than the pressure in the pressure vessel" means any pressure lower than the inner pressure of the pressure vessel from which an aqueous dispersion of resin particles is released. Usually a pressure in the vicinity of atmospheric pressure is selected therefor.

The produced pre-expanded particles are separated from the aqueous dispersion medium and dried without washing. The separated dispersion medium is recovered and stored in a tank, and is returned to the pressure vessel to use as a dispersion medium again. Since the amount of a dispersing agent which sticks to and remains on the surface of the pre-expanded particles is small, washing of the pre-expanded particles is not required, but may be of course conducted with water as occasion demands. In that case, the washing waste water may also be reused as a dispersion medium.

The thus obtained pre-expanded particles made of a thermoplastic resin composition have an expansion ratio of 3 to 40, especially 4 to 20, a closed cell ratio of 80 to 100%, especially 90 to 100%, an average cell diameter of 50 to 500 $\mu$m, especially 100 to 300 $\mu$m, and a sticking dispersant content of at most 3,000 p.p.m.

If the expansion ratio is less than 3, the flexibility and cushioning properties of molded articles obtained by in-mold foaming of the pre-expanded particles become insufficient. If the expansion ratio exceeds 40, the mechanical strength and heat resistance of the molded articles become insufficient. Also, if the closed cell ratio is less than 80%, the pre-expanded particles are short of the secondary expanding force, so melt-adhesion failure occurs upon molding to deteriorate the mechanical strength and the like of the molded articles. If the average cell diameter is less than 50 $\mu$m, there arises a problem that the shape of the molded articles is distorted. If the average cell diameter exceeds 500 $\mu$m, the mechanical strength of the molded articles is lowered.

Molding of the thermoplastic resin pre-expanded particles prepared by the process of the present invention can be carried out by known methods. For example, after optionally impregnating the pre-expanded particles with air to impart an expandability thereto by maintaining the pre-expanded particles in a pressure vessel for a predetermined period of time under heat and pressure, the pre-expanded particles are filled in a mold and heated by steam to fuse together, thus giving in-mold foamed articles. Since the pre-expanded particles have a closed cell ratio of 80% or more, the obtained cellular molded articles have a shape exactly corresponding to that of the mold.

The thus obtained cellular molded articles have excellent flexibility and cushioning property and also have a small dimensional shrinkage and a small shape deformation, thus having an extremely high commodity value.

According to the process of the present invention, the amount of a dispersing agent to be charged can be decreased, whereby the amount of dispersing agent which sticks to and remains on the pre-expanded particles can be decreased. Therefore, the produced pre-expanded particles are not required to wash with water or an acid. Further, even if the aqueous dispersion medium containing, as a dispersing agent, a slightly water-soluble inorganic compound (inorganic dispersant) and a surface active agent (dispersing assistant) is recovered and recycled to the pressure vessel for preparing an aqueous dispersion of resin particles, the formed dispersion is stable and, therefore, the aqueous dispersion medium can be repeatedly used without causing any trouble.

A substance which remains on the surface of the pre-expanded particles and hinders melt-adhesion of the pre-expanded particles in molding thereof is mainly an inorganic dispersant. No substantial problem of melt-adhesion hindrance arises if the amount of the remaining inorganic dispersant is below a certain level. This level varies depending on various conditions such as the characteristics of aqueous dispersion medium, the kind of thermoplastic resin, the size of resin particles, the charging proportions of dispersion medium and resin particles, the heating and stirring conditions, and the kind, amount and combination of inorganic dispersant and dispersing assistant and, therefore, cannot be generically determined. In general, the amount of the inorganic dispersant remaining on the surface of pre-expanded particles is required to be at most 3,000 p.p.m., preferably at most 2,000 p.p.m., more preferably at most 1,500 p.p.m., the most preferably at most 1,000 p.p.m. For example, in case of using calcium tertiary phosphate as an inorganic dispersant, problem in melt-adhesion of pre-expanded particles in foaming thereof scarcely arises if the amount of the remaining dispersant is 1,500 p.p.m. or less, and no problem arises if the amount is 1,000 p.p.m. or less.

Therefore, it is necessary to control the amount of initial charge of an inorganic dispersant so that in general the amount of the inorganic dispersant remaining on the surface of the produced pre-expanded particles is maintained below 3,000 p.p.m. without washing the pre-expanded particles.

For example, in case of using calcium tertiary phosphate as an inorganic dispersant, the amount of calcium phosphate remaining on the surface of pre-expanded particles can be kept on an acceptable level when it is charged in an amount of at most 2.0 parts by weight, preferably at most 1.0 part by weight, more preferably at most 0.8 part by weight, per 100 parts by weight of resin particles even if the dispersion medium is recycled.

Although a slight amount of water, inorganic dispersant and dispersing assistant go out of the system together with the produced pre-expanded particles, the amount of the aqueous dispersion medium recovered and reused and the proportions of components included therein are nearly constant. Therefore, it is sufficient to supplement the loss of the components in view of the recovery percentage of the aqueous dispersion medium, and the recovered dispersion medium can be reused without measuring the contents of respective components every reuse. Of course, the proportions of components included in the recycled dispersion medium may be monitored as occasion demands.

For the recovery of aqueous dispersion medium containing an inorganic dispersant and a dispersing assistant, there can be used any of apparatuses which can separate the produced pre-expanded particles from the dispersion medium and can recover the separated dispersion medium, e.g., a container wherein a filter such as a screen having openings sufficiently smaller than the size of the pre-expanded particles is disposed at a bottom portion and a pipe for discharging the separated dispersion medium is disposed at the bottom. The recovered dispersion medium is sent to a recovery tank and is reused as a dispersion medium in the next operation for the preparation of pre-expanded particles.

The present invention is more specifically described and explained by means of the following examples and comparative examples, in which all parts and % are by weight unless otherwise noted. It is to be understood that the present invention is not limited to these examples.

The characteristics shown in examples and comparative examples were measured by the following methods.

Expansion Ratio (Dry State)

About 3 to 10 g of pre-expanded particles were dried at 60° C. for 6 hours. The weight (W) of the dry particles was measured, and the volume (V) thereof was then measured by dipping the particles in water. The true specific gravity $\rho b = W/V$ of the pre-expanded particles was calculated and, from the true specific gravity ($\rho b$) and the density ($\rho r$) of a thermoplastic resin composition used as the raw material of the pre-expanded particles, the expansion ratio $K = \rho r / \rho b$ was calculated.

Waste Water Recovery

The waste water recovery (R), namely recycle percentage, was obtained by dividing the weight ($W_0$) of recovered waste water by the weight ($W_1$) of the weight of water charged according to the following equation:

$$R(\%) = (W_0 / W_1) \times 100.$$

Amount of Sticking Dispersant (in Case of Using Calcium Tertiary Phosphate as an Inorganic Dispersant)

A conical beaker was charged with $W_b$ g of pre-expanded particles and 50.0 ml of an aqueous solution (calorimetric solution) of 0.022% of ammonium metavanadate, 0.54% of ammonium molybdate and 3% of nitric acid. They were stirred for 1 minute and allowed to stand for 10 minutes. The liquid phase of the mixture was placed in a quart cell having an optical path length of 1.0 cm, and the absorbance (A) was measured at 410 nm by a spectrophotometer.

The amount of sticking dispersant (X p.p.m.) was calculated by using the absorption coefficient ε (g/liter·cm) of calcium tertiary phosphate previously measured at 410 nm with respect to the same calorimetric solution according to the following equation.

$$X(\text{p.p.m.}) = (5.0 \times 10^4 \cdot \epsilon \cdot A) / W_b$$

Reference Example

To 100 parts of a polyolefin resin (an ethylene-propylene random copolymer having an ethylene content of 3.1%, a density of 0.91 g/cm$^3$, an MI of 5.5 g/10 min. and a modulus of flexural elasticity of 10,000 kg/cm$^2$) were added 2 parts of a hydrophilic polymer (an ionomer in which a copolymer of 85% of ethylene and 15% of methacrylic acid was intermolecularly crosslinked with sodium ion and 60% of the methacrylic acid units was neutralized with sodium ion and which had an MI of 0.9 g/ 10 min., a melting point of 89° C. and a water absorption of 1%) and a filler (talc having an average particle size of 7 μm). The resulting mixture was fed to a 50 mmφ single screw extruder, melt-kneaded, extruded through a cylindrical die having a diameter of 1.5 mm, cooled and cut to pieces to give columnar resin particles (pellets) made of a polyolefin resin composition and having a weight of 1.8 mg/particle. The obtained resin particles had a softening point of 63° C., a melting point of 145° C. and a density of 0.90 g/cm$^3$ measured according to JIS K7112.

A closed pressure vessel 3 of an apparatus as shown in FIG. 1 was charged with 100 parts of the thus obtained resin particles, 0.5 part of calcium tertiary phosphate as an inorganic dispersant and 0.005 part of sodium n-paraffinsulfonate as a dispersing assistant together with 150 parts of water. The content in the vessel was heated to 154.0° C. with stirring. At that time, the inner pressure of the vessel was about 5 kg/cm$^2$G.

Thereafter, the pressure in the vessel was elevated to 23 kg/cm$^2$G by pressurizing with air. Immediately a valve 4 provided at a lower part of the pressure vessel 3 was opened to release the aqueous dispersion (dispersion of resin particles 1 made of polyolefin resin composition dispersed in aqueous dispersion medium 2) into a lower pressure chamber 6 (atmospheric pressure) through an orifice 5 having a diameter of 4 mm to give pre-expanded particles 7 having a closed cell structure. During the release of the aqueous dispersion of resin particles, the inner pressure of the vessel 3 was maintained by introducing air into the vessel. The expansion ratio of the pre-expanded particles was 13. The produced pre-expanded particles were not washed.

Pre-expanded particles 7 and aqueous dispersion medium 10 containing the inorganic dispersant and the dispersing assistant were separated at filtration part 12 provided at the other end of the lower pressure chamber 6. The pre-expanded particles were sent from the chamber 6 to a container 15 for drying through a line 13 by feeding air (transport medium 14) from transport medium feed part 11 to the chamber 6. The aqueous dispersion medium 10 separated from the pre-expanded particles was discharged from discharge port 9 and recovered in waste water recovery tank 8.

Figure 2:
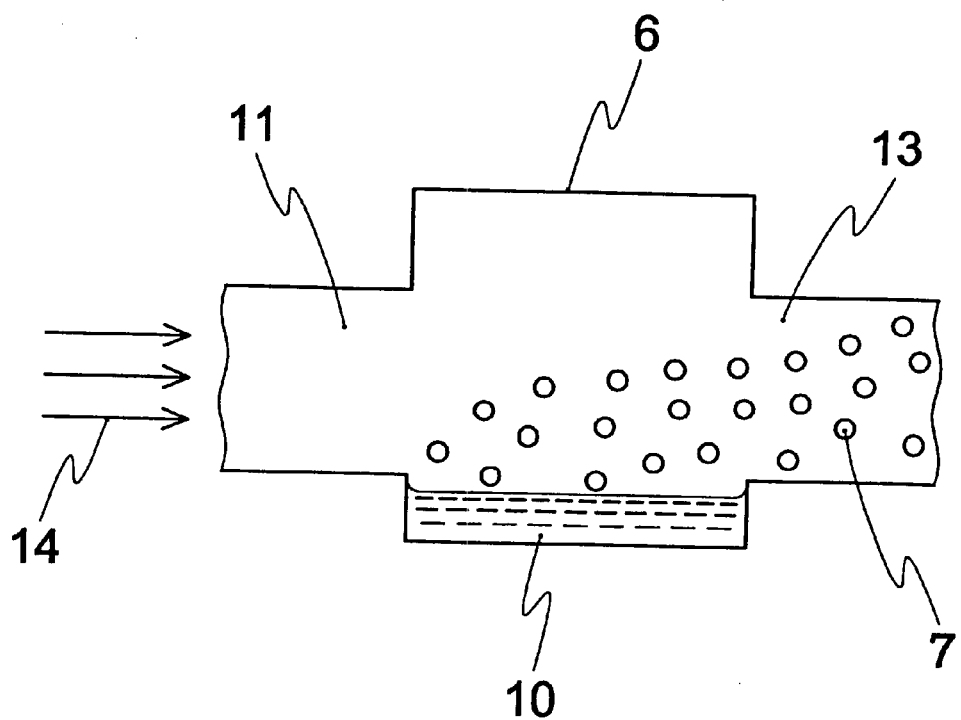
FIG. 2 is a cross section view taken on line X—X of FIG. 1.

FIG. 2 is a cross section view taken on line X—X of FIG. 1, and schematically shows the step of separating the pre-expanded particles 7 and the dispersion medium 10.

The pre-expanded particles 7 were dried in container 15 equipped with a temperature recorder 16 by hot air which was introduced by a dry air blower 17 through a heater 18 and exhausted through a line 19.

The amount of inorganic dispersant (calcium tertiary phosphate) sticking to the surface of pre-expanded particles based on the pre-expanded particles was measured. The result is shown in Table 1 together with the amount of the charged inorganic dispersant based on the non-expanded resin particles.

EXAMPLE 1

The dispersion medium 10 recovered in tank 8 as waste water in the foregoing Reference Example (waste water recovery 95%) was charged in the pressure vessel 3 in order to make a waste water recycle test. Pre-expanded particles were prepared in the same manner as in the Reference Example except that the recovered dispersion medium 10 was used instead of a fresh dispersion medium containing inorganic dispersant and dispersing assistant, and shortage of inorganic dispersant, dispersing assistant and water were supplied. The obtained pre-expanded particles had an expansion ratio of 13.

The amount of inorganic dispersant (calcium tertiary phosphate) sticking to the surface of pre-expanded particles based on the pre-expanded particles was measured. The results are shown in Table 1.

EXAMPLE 2

The second waste water recycle test was made in the same manner as in Example 1 except that the dispersion medium 10 recovered in tank 8 in Example 1 (waste water recovery 96%) was further charged in the pressure vessel, and shortage of inorganic dispersant, dispersing assistant and water were supplied. The obtained pre-expanded particles had an expansion ratio of 13.

The results are shown in Table 1.

Comparative Example 1

A closed pressure vessel 3 was charged with 100 parts of pellets (about 1.8 mg/particle) of an ethylene-propylene random copolymer having a melting point of 149° C., 150 parts of water, 0.7 part of calcium tertiary phosphate as an inorganic dispersant, 0.03 part of sodium n-paraffinsulfonate as a dispersing assistant and 12.0 parts of isobutane. The temperature was then elevated with stirring. In the course of elevating the temperature to 148.5° C., the pellets in the vessel agglomerated to form a mass owing to shortage of the inorganic dispersant.

Comparative Example 2

A closed pressure vessel 3 was charged with 100 parts of pellets (about 1.8 mg/particle) of an ethylene-propylene random copolymer having a melting point of 149° C., 150 parts of water, 2.0 parts of calcium tertiary phosphate as an inorganic dispersant, 0.03 part of sodium n-paraffinsulfonate as a dispersing assistant and 12.0 parts of isobutane. The temperature was then elevated to 148.5° C. with stirring. After holding the dispersion in the vessel for 20 minutes, the inner pressure of the vessel was adjusted to 19.3 kg/cm2G by introducing isobutane to the vessel and held for 10 minutes.

The aqueous dispersion in the vessel was then released to atmospheric pressure through an orifice having a diameter of 4 mm to give pre-expanded particles by opening a valve provided at a lower part of the pressure vessel, while maintaining the temperature and pressure in the vessel by introducing isobutane into the vessel. The expansion ratio of the pre-expanded particles was 24. The produced pre-expanded particles were not washed.

The results are shown in Table 1.

TABLE 1

|  | Amount of inorganic dispersant charged (part) | Amount of sticking dispersant (p.p.m.) | Dispersion stability in pressure vessel |
| --- | --- | --- | --- |
| Ref. Ex. | 0.5 | 870 | good |
| Ex. 1 | 0.5 | 800 | good |
| Ex. 2 | 0.5 | 830 | good |
| Com. Ex. 1 | 0.7 | — | bad |
| Com. Ex. 2 | 2.0 | 5,000 | good |

It would be understood from the foregoing description that according to the process of the present invention, it is not required to conduct washing of pre-expanded particles with water or an acid which has been conventionally conducted to remove a dispersant sticking to the surface of the produced pre-expanded particles and, therefore, the amount of water or energy for heating water can be greatly reduced, and that since cost for treating waste water, utility cost, acid resistant equipment and waster water treatment equipment are not required, equipment cost can be greatly reduced. Further, since no waste water is discharged, the process of the present invention is also advantageous from the viewpoint of environmental protection.

What we claim is:

1. A batch process for preparing pre-expanded particles of a thermoplastic resin comprising:
   charging particles of a thermoplastic resin and an aqueous dispersion medium containing, as a dispersing agent, a slightly water-soluble inorganic compound and a surface active agent into a closed pressure vessel, the amount of said slightly water-soluble inorganic compound being from 0.15 to 2.0 parts by weight per 100 parts by weight of said particles of thermoplastic resin,
   heating the resulting aqueous dispersion of the resin particles to a temperature of not less than the softening point of said thermoplastic resin in said vessel,
   releasing said aqueous dispersion of the resin particles containing a blowing agent consisting essentially of water in an amount sufficient to expand said resin particles in an expansion ratio of 3 to 40 from said closed vessel into an atmosphere of lower pressure than the inner pressure of said closed vessel, thereby expanding said particles,
   separating the produced pre-expanded particles and subsequently drying them without washing,
   recovering said aqueous dispersion medium containing the slightly water-soluble inorganic compound and the surface active agent, and
   recycling the recovered aqueous dispersion medium to said closed pressure vessel as a dispersion medium for a subsequent batch process.

2. The process of claim 1, wherein the amount of said slightly water-soluble inorganic compound is from 0.3 to 1.0 parts by weight per 100 parts by weight of said particles of thermoplastic resin.

3. The process of claim 1, wherein said particles of thermoplastic resin are particles of a polyolefin resin.

4. The process of claim 1, wherein said particles of thermoplastic resin are particles made of a polyolefin resin composition containing a polyolefin resin and 0.01 to 20 parts by weight of a hydrophilic polymer per 100 parts by weight of said polyolefin resin.

5. The process of claim 4, wherein said hydrophilic polymer is an ethylene-based ionomer resin.

6. The process of claim 1, wherein said releasing of aqueous dispersion is carried out while maintaining the inner pressure of said closed vessel within the range of 6 to 75 kg/cm$^2$G.

7. The process of claim 1, wherein prior to releasing said aqueous dispersion from the closed vessel into the lower pressure atmosphere, the inner pressure of said closed vessel is raised to 6 to 75 kg/cm$^2$G by introducing an inorganic gas to said closed vessel, and subsequently said aqueous dispersion is released while maintaining that pressure.

* * * * *